(12) United States Patent
Kankaria et al.

(10) Patent No.: US 11,379,795 B2
(45) Date of Patent: *Jul. 5, 2022

(54) AUTOMATED DATA DISCOVERY WITH AGGREGATED AUTHENTICATION

(71) Applicant: Visa International Service Association, San Francisco, CA (US)

(72) Inventors: Ashish Vinod Kankaria, Nashik (IN); Sunny Raj Rathod, Pune (IN); Naman Bansal, Dehradun (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,671

(22) Filed: May 11, 2021

(65) Prior Publication Data
US 2021/0264364 A1    Aug. 26, 2021

Related U.S. Application Data

(63) Continuation of application No. 16/475,338, filed as application No. PCT/US2017/014399 on Jan. 20, 2017, now Pat. No. 11,037,102.

(51) Int. Cl.
*G06F 15/16* (2006.01)
*G06Q 10/10* (2012.01)
(Continued)

(52) U.S. Cl.
CPC ............. *G06Q 10/10* (2013.01); *G06F 21/30* (2013.01); *G06Q 10/109* (2013.01);
(Continued)

(58) Field of Classification Search
CPC .... G06Q 10/10; G06Q 10/109; G06Q 20/401; H04W 12/068; H04W 12/08;
(Continued)

(56) References Cited

U.S. PATENT DOCUMENTS 8,311,942 B1 * 11/2012 Mason .................. G06Q 10/10
705/40
2009/0313101 A1    12/2009 McKenna et al.
(Continued)

FOREIGN PATENT DOCUMENTS

KR      1020140141802       12/2017

OTHER PUBLICATIONS

U.S. Appl. No. 16/475,338, Final Office Action, dated Nov. 30, 2020, 17 pages.
(Continued)

*Primary Examiner* — Wing F Chan
*Assistant Examiner* — Joseph R Maniwang
(74) *Attorney, Agent, or Firm* — Kilpatrick Townsend & Stockton LLP (57) ABSTRACT

A method that can allow for aggregated authentication and authorization of future actions is disclosed. The method may aggregate authentication and authorization based at least in part on automatically and periodically scanning data at a client computer. The client computer can display an aggregated set of deadlines and prompt the user operating the client computer to approve of further actions. Once approved, the client computer can transmit a single authentication message to a service computer in order to initiate a plurality of actions.

20 Claims, 9 Drawing Sheets

(51) Int. Cl.
*G06F 21/30* (2013.01)
*G06Q 20/40* (2012.01)
*H04L 9/32* (2006.01)
*H04L 9/40* (2022.01)
*H04L 67/62* (2022.01)
*H04W 12/08* (2021.01)
*H04W 12/06* (2021.01)

(52) U.S. Cl.
CPC ......... *G06Q 20/401* (2013.01); *H04L 9/3226* (2013.01); *H04L 63/0807* (2013.01); *H04L 67/325* (2013.01); *H04W 12/068* (2021.01); *H04W 12/08* (2013.01)

(58) Field of Classification Search
CPC ... G06F 21/30; H04L 9/3226; H04L 63/0807; H04L 67/325
See application file for complete search history.

(56) References Cited

U.S. PATENT DOCUMENTS

| | | | |
|---|---|---|---|
| 2010/0241559 A1* | 9/2010 | O'Connor | G06Q 10/10 705/39 |
| 2013/0254110 A1 | 9/2013 | Royyuru et al. | |
| 2014/0058949 A1 | 2/2014 | Ciurea | |
| 2014/0244453 A1* | 8/2014 | Rephlo | G06Q 40/12 705/30 |
| 2014/0358789 A1 | 12/2014 | Boding et al. | |
| 2015/0372955 A1* | 12/2015 | Janakiraman | H04L 51/12 707/731 |
| 2016/0034900 A1 | 2/2016 | Nelsen et al. | |
| 2018/0123997 A1* | 5/2018 | Celedonia | G06Q 10/10 |
| 2018/0144042 A1 | 5/2018 | Sheng et al. | |

OTHER PUBLICATIONS

U.S. Appl. No. 16/475,338, Non-Final Office Action, dated Aug. 3, 2020, 12 pages.
Bostrom et al., "Automatic Reading and Interpretation of Paper Invoices", Independent Project in Information Engineering, Available Online at: https://uu.diva-portal.org/smash/get/diva2:967971/FULLTEXT01.pdf, May 31, 2016, 38 pages.
Application No. EP17892728.1, Extended European Search Report, dated Sep. 20, 2019, 8 pages.
Application No. PCT/US2017/014399, International Search Report and Written Opinion, dated Oct. 23, 2017, 14 pages.

* cited by examiner

| PROVIDER | TASK | DEADLINE |
|---|---|---|
| Provider A | A | January 1 |
| Provider B | B | January 15 |
| Provider C | C | January 15 |
| Provider D | D | January 20 |
| Provider E | E | January 22 |

Respond YES to All Requests

AUTOMATED DATA DISCOVERY WITH AGGREGATED AUTHENTICATION

CROSS-REFERENCE TO RELATED APPLICATIONS

The present application is a continuation of U.S. patent application Ser. No. 16/475,338 filed on Jul. 1, 2019, which claims the benefit of the filing date of PCT Patent Application No. PCT/US2017/014399 filed Jan. 20, 2017, the entire disclosures of each of which are incorporated herein by reference in their entirety for all purposes.

BACKGROUND

Conventional systems request that users respond to specific action items. For example, many conventional systems can include systems that might remind a user that an invoice is to be paid or is due. Such systems generally include multiple resource providers, and each resource provider may send a specific action item request. When a user uses multiple resource providers, those multiple resource providers may send action item requests at different times and in different formats. In such systems, there is a risk that the user may miss one or more action item requests. Further, even if the user is able to respond to each and every action item request, responding to each and every action item request is very time consuming.

Embodiments of the invention address these and other problems, individually and collectively.

SUMMARY

Embodiments of the invention are directed to methods and systems, which can improve the efficiency of conventional systems and methods that might provide a number of action requests to a user.

One embodiment of the invention is directed to a method. The method comprises receiving a plurality of messages including a plurality of dates, and automatically and periodically scanning the plurality of messages to determine a set of messages. The method also includes prompting a user of the client computer to determine if actions are to be taken with respect to services associated with the set of messages in the plurality of messages. The set of messages have dates within a predetermined time range. The method also includes receiving an authentication credential from the user in response to the prompting, and then transmitting an authentication message to a server computer. The server computer thereafter initiates the actions with respect to services associated with the set of messages.

Another embodiment of the invention is directed to a client computer configured to perform the above-noted method.

Another embodiment of the invention is directed to a method comprising receiving an authentication message. The authentication message either including an authentication credential or an authentication result of the authentication credential by a client computer. The method also includes initiating actions with respect to services associated with a set of messages having dates within a predetermined range, the set of messages being within a plurality of messages that was previously transmitted by a plurality of resource provider computers to the client computer.

Another embodiment of the invention is directed to a server computer configured to perform the above-noted method.

Other embodiments include systems, computer-readable media, and apparatuses for performing the method described above.

DETAILED DESCRIPTION

Embodiments of the invention are directed to methods and systems that allow for aggregated authentication and authorization of future actions based at least in part on automatically and periodically scanning data at a client computer. For example, the client computer may receive data in the form of a plurality of messages from one or more resource providers. The client computer can automatically scan the data in each message to determine a deadline and an action that needs to be performed before the deadline in each message. This data and corresponding action may include, for example, a notification message to pay a bill, a notification message of an upcoming deadline for a task, or an event notification message associated with future actions and due dates. The client computer can then identify a set of messages within a time range and aggregate the deadlines for display at a user interface, so that the user can review the deadlines. In some examples, the client computer can prompt the user operating the client computer and an authentication credential can be provided by the user to the client computer in response to this prompting. The authentication credential can include, for example, a user name, a password, personal identification number (PIN), or biometric credential (e.g., fingerprint, eye scan, etc.). Once the authentication credential has been received from the user, the client computer can transmit a single authentication message to a service computer in order to initiate a plurality of actions such as payments. These actions may correspond with the deadlines determined from the data analyzed in the plurality of messages.

Before discussing embodiments of the invention, some descriptions of some terms may be helpful.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. Other standard message formats may include ISO 20022 as well as blockchain message format. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. In addition, an authorization request message may further comprise open data fields, in which additional values may be requested and stored. For example, an authorization request message may comprise a request for a recurrence value indicating at least a frequency of interactions between a user and a resource provider computer. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

A "resource provider" may be an entity that can provide a resource such as goods, services, information, and/or access. Examples of a resource provider includes merchants, data providers such as government agencies, transit agencies, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

Figure 1:
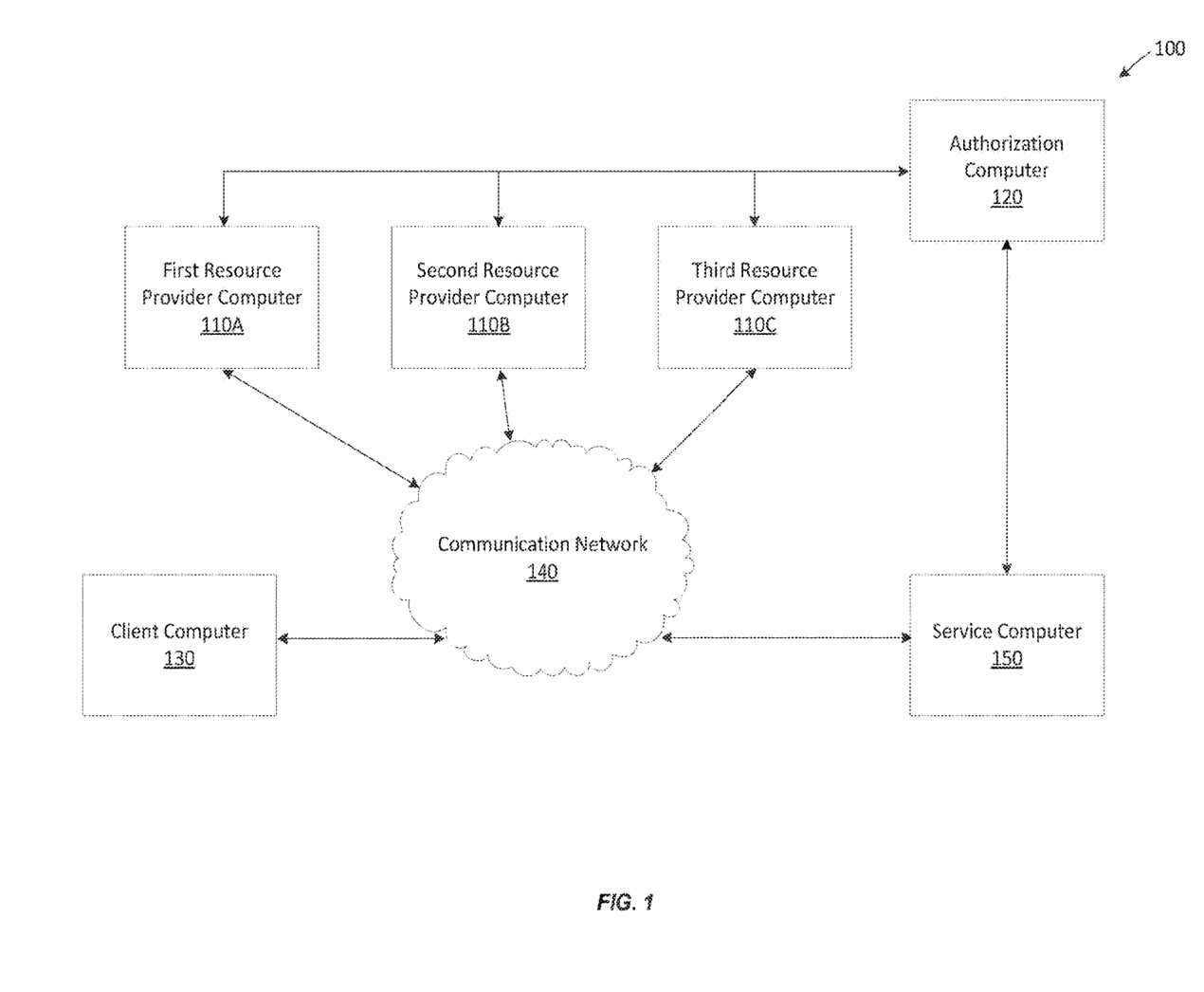
FIG. 1 shows a block diagram of a system according to an embodiment of the invention.

FIG. 1 shows a system 100 including a plurality of resource provider computers 110 including a first resource provider computer 110A, a second resource provider computer 110B, and a third resource provider computer C 110C. Although the resource provider computers are shown in this illustration, it is understood that embodiments of the invention may include any suitable number of resource provider computers. Each resource provider associated with each resource provider computer 110A, 110B, 110C can provide goods and services to one or more users that operate the client computer 130.

Each of the entities in FIG. 1 may communicate through any suitable communication channel or communications network. A suitable communications network may be any one and/or the combination of the following a direct interconnection: the Internet; a Local Area Network (LAN); a Metropolitan Area Network (MAN); an Operating Missions as Nodes on the Internet (OMNI); a secured custom connection: a Wide Area Network (WAN): a wireless network (e.g., employing protocols such as, but not limited to a Wireless Application Protocol (WAP), I-mode, and/or the like); and/or the like.

The resource provider computers 110A, 110B, 110C may be in communication with the client computer 130 as well as a service computer 150 via a communications network 140. An authorization computer 120 may be in communication with the service computer 150 as well as the first, second, and third resource provider computers 110A, 110B, 110C.

The resource provider computers 110 may transmit a plurality of messages to the client computer 130 via the communication network 140 at the same or different times. The client computer 130 may receive these messages as text messages, SMS messages, e-mail messages, and the like. The plurality of messages may be stored with the client computer 130. Alternatively, or additionally, the plurality of messages may be stored at a remote computer (not shown) that can be accessed by the client computer 130. In some embodiments, whether they are stored locally or remotely, the client computer 130 may scan these messages and may prompt the user to take actions on a subset of the messages, based on the contents of the messages in the subset.

Figure 2:
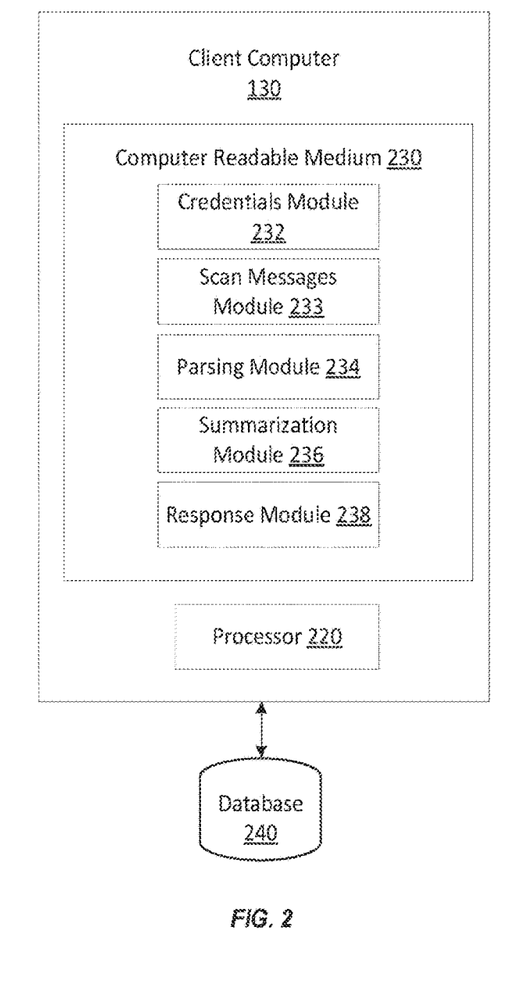
FIG. 2 shows a block diagram of a client computer according to an embodiment of the invention.

FIG. 2 shows a block diagram of the client computer 130 according to an embodiment of the invention. The client computer 130 may comprise a processor 220 and a non-transitory computer readable medium 230 in communication with a database 240. The computer readable medium 230 may comprise software modules including a credentials module 232, scan messages module 233, parsing module 234, summarization module 236, and response module 238.

Figure 5:
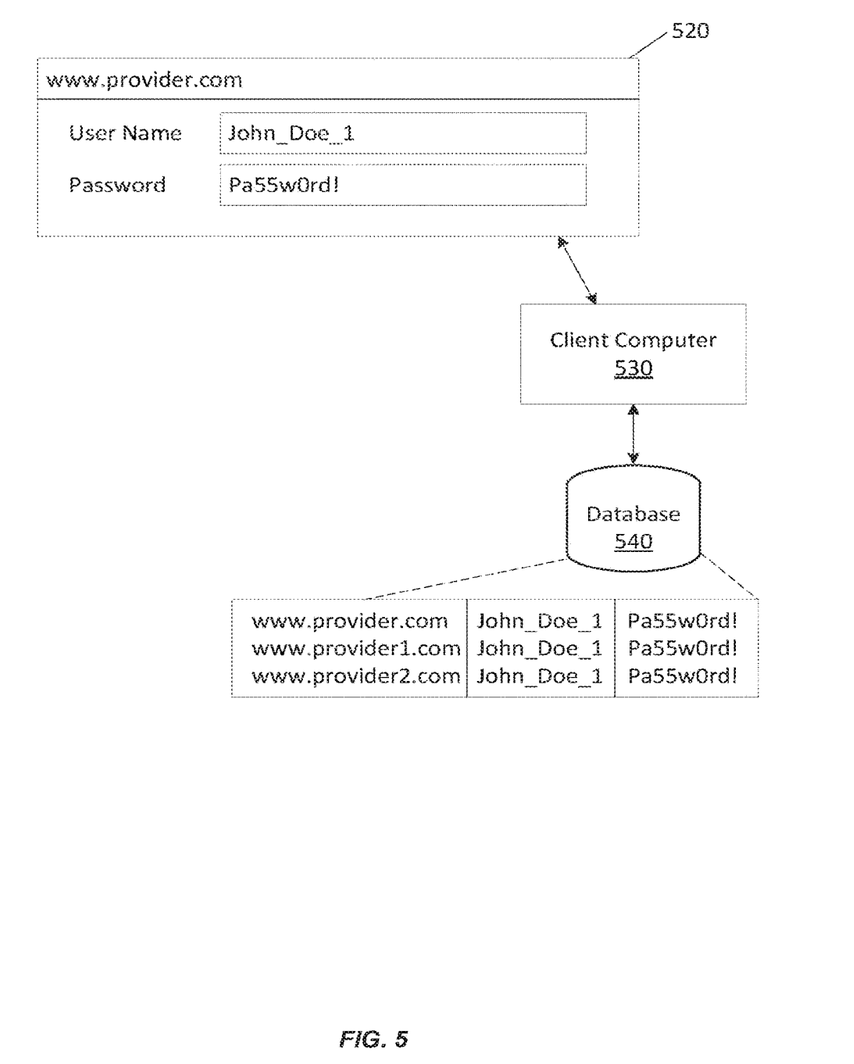
FIG. 5 shows a process for receiving data, according to one embodiment of the invention.

The credentials module 232 may comprise code that may cause the processor 220 to receive, store, and/or provide authentication credentials for a user. Sample authentication credentials are illustrated in FIG. 5. To receive the authentication credential, in some examples, the credentials module 232, working in conjunction with the processor 220, may prompt the user at the client computer 130 to provide a user name and password to access an email account. For example, the first resource provider computer 110A may provide banking services for the user. The user may provide their email address as a user name and a password that complies with first resource provider computer's requirements for a password (e.g., capital/lowercase letters, numbers, symbols, minimum number of characters, etc.). The credentials module 232, in conjunction with the processor 220, may activate and display a keyboard or other input user interfaces to accept the appropriate authentication credential from the user. In another example, the credentials module 232, in conjunction with the processor 220, may cause the client computer 130 to receive a biometric credential (e.g., fingerprint, eye scan, etc.) as the authentication credential via a camera, sensor, or other device in the client computer 130.

The authentication credential may be stored with the database 240 and/or provided as authentication by the client computer 130 to other computers, at least in part to confirm an identity of the user. In some examples, the credentials module 232, in conjunction with the processor 220, may cause the client computer 130 to provide the authentication credential to authenticate the user prior to initiating a transaction or transmitting a message to a secondary computer to instruct it to perform an action.

The computer readable medium 230 may also comprise a scan messages module 233. The scan messages module 233, in conjunction with the processor 220, may be configured to scan the plurality of messages, including messages that are stored in database 240, local memory, or a remote computer (e.g., e-mail server computer, etc.). The scan messages module 233, and the processor 220, may cause the computer 130 to receive, access, and/or scan the plurality of messages, which may include dates, from various resource provider computers 110. The scanning may be initiated at predetermined times (e.g., every five minutes, whenever an application on the client computer 130 is activated, every day at midnight, every fifteen days, etc.), and may occur automatically and periodically.

The computer readable medium 230 may also comprise a parsing module 234. The parsing module 234 may, in conjunction with the processor 220, be configured to compare the text of e-mail and/or text messages (e.g., including short message service (SMS) messages, etc.) to one or more templates of known resource provider computer 110 messages. The templates may be stored at a memory of the client computer 130 and/or the database 240 (e.g., remote from the client computer 130, hosted by a backend computer or network, etc.). The comparison may help determine data in the messages, including deadlines, the resource provider's name, etc. The parsing module 234 may, in conjunction with the processor 220, cause the client computer 130 to determine a set of messages within the plurality of messages. The set of messages may have dates within a predetermined time range (e.g., only deadlines that occur within the next week, etc.).

The parsing module 234 may, in conjunction with the processor 230, be configured to parse the identified messages. For example, the parsing module 234 may identify individual terms in the message that are provided in a computer-readable form (e.g., standard text messages, etc.) and/or by using an optical character recognition (OCR) algorithm. The identified terms in the text may be compared with a dictionary of terms. The terms that are stored in the dictionary may help identify the type of message and/or template that corresponds with the particular type of message. This can be used to identify values associated with the identified terms (e.g., deadline="January 1" or resource provider="Acme Co." etc.). Another sample parsing process is illustrated with FIG. 6 and described in detail below.

Figure 8:
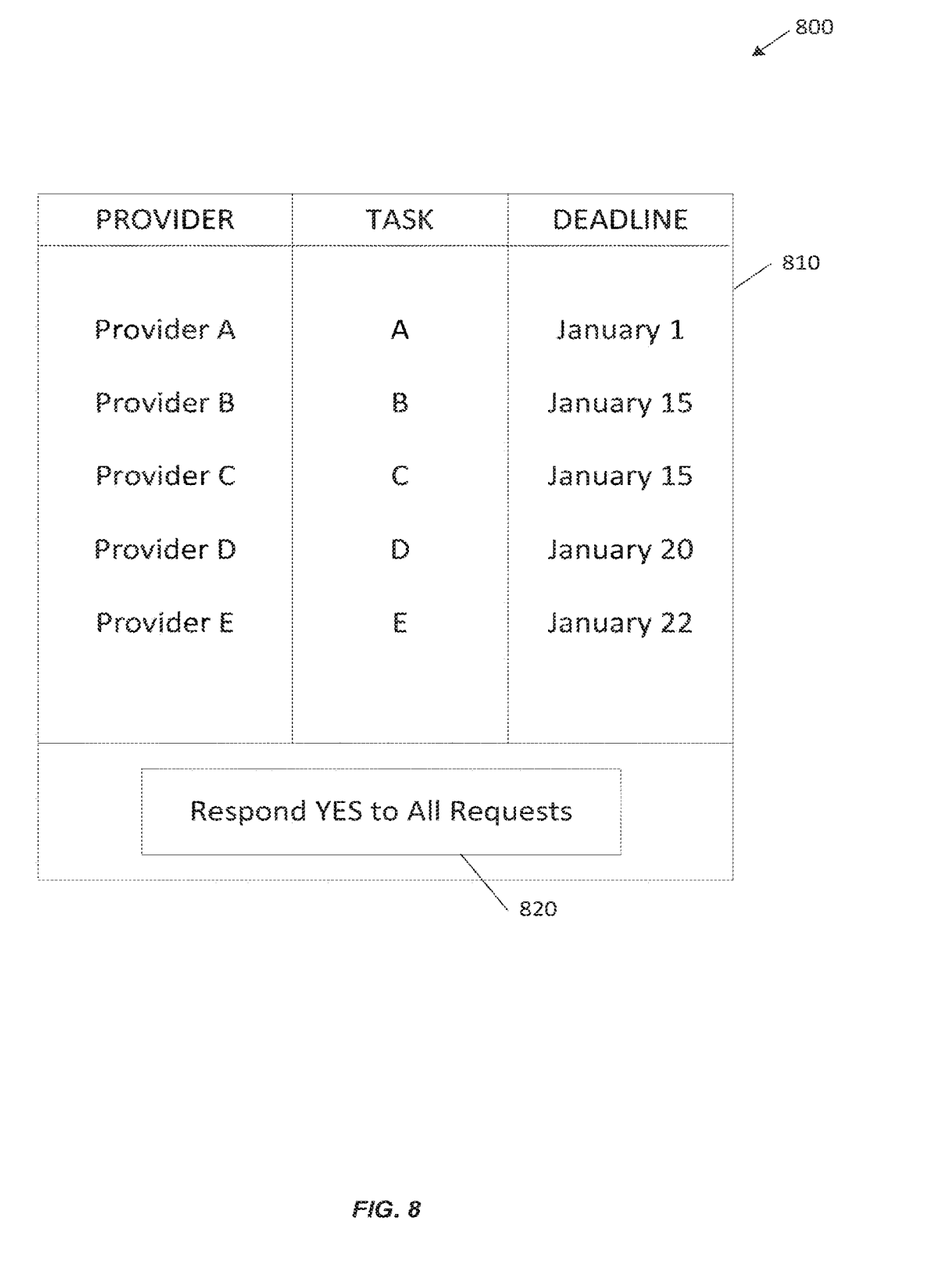
FIG. 8 illustrates a user interface for summarizing messages, according to one embodiment of the invention.

The computer readable medium 230 may also comprise a summarization module 236. The summarization module 236 may, in conjunction with the processor 220, be configured to retrieve data from the plurality of messages for a particular time range (e.g., 16th of the prior month to 15th of the current month, etc.) and not data outside the time range. The summarization may include data that are identified from the parsing module 234 (e.g., resource provider="Acme Co.," deadline data that corresponds with each particular resource provider, etc.). The summarization module 236, in conjunction with the processor 220, can generate a single display for a user interface on the client computer 130. The user interface may include the resource provider name, deadline(s), and other relevant information for a set of messages as illustrated in FIG. 8. The display may also support user interaction at the client computer 130 (e.g., by allowing the user to select a particular resource provider deadline for more information, retrieve additional details associated with a bill, etc.).

The computer readable medium 230 may also comprise a response module 238. The response module 238 may, in conjunction with the processor 220, be configured to generate an authentication message and transmit the authentication message to the service computer 150. In some embodiments, the authentication message may comprise user information including the user's name, a payment account identifier, and an approval to deduct funds from the user's account and transfer those funds to the resource provider's account.

In some embodiments, the response module 238, in conjunction with the processor 220, may be configured to initiate a plurality of actions such as payment transactions. The payment transactions may include deadlines for payment and these deadlines may be provided in a consolidated summary and displayed in the user interface of the client computer 130. In some embodiments, the response module 238, in conjunction with the processor 220, may provide a single, consolidated message to the service computer 150. In response, the service computer 150 can use the single message to initiate the generation of separate messages that will be sent to the resource provider computers 110A, 110B. 110C. In some embodiments, the response module 238 and the processor 220 may generate multiple, individual messages that correspond with each resource provider computer deadline displayed on the user interface of the client computer 130.

Figure 3:
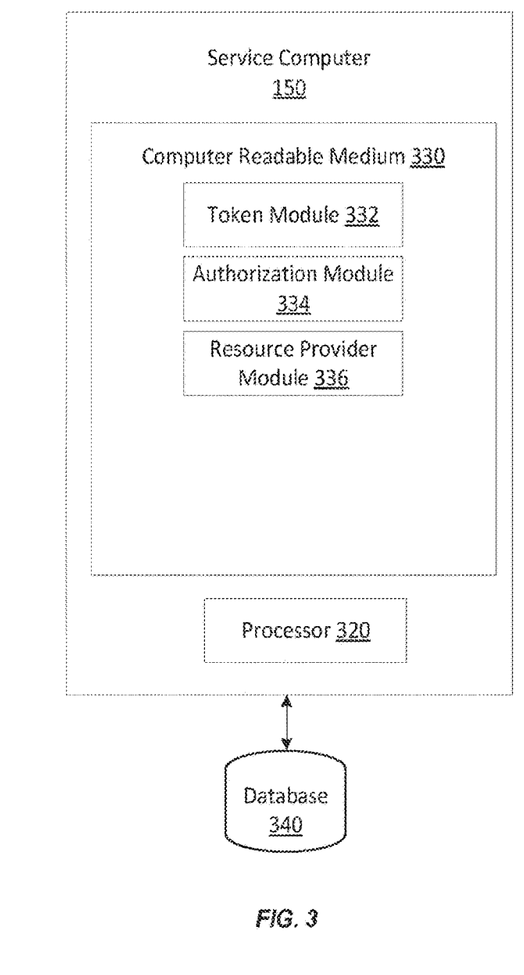
FIG. 3 shows a block diagram of a service computer according to one embodiment of the invention.

Referring to FIGS. 1 and 3, the service computer 150 may receive, process, and initiate further actions in response to receiving a transmitted authentication message from the client computer 130. One potential action comprises generating and submitting one or more transaction authorization messages to an authorization computer 120. The transaction authorization messages can comprise a resource provider computer identifier and/or an authentication request associated with a service identified in the original messages to the client computer 130. In some examples, the transaction authorization message can request authorization of a transaction associated with a particular resource provider computer 110 and client computer 130. Additional detail regarding the service computer 150 is provided with FIG. 3.

FIG. 3 shows a block diagram of the service computer 150 according to one embodiment of the invention. The service computer 150 may comprise a processor 320 and a computer readable medium 330. The service computer 150 may contain or be in communication with a database 340. The computer readable medium 330 may comprise software modules including a token module 332, authorization module 334, and resource provider module 338. Although three specific modules are illustrated, more or fewer modules may be present in the service computer 150.

The token module 332 may, in conjunction with the processor 320, be configured to generate a payment token for a transaction. The payment token may include a transaction identifier associated with a user's account maintained by the authorization computer 120.

The authorization module 334 may, in conjunction with the processor 320, be configured to include the payment token in an authorization request message that is generated by the authorization module 334. The authorization module 334, may in conjunction with the processor 320, may transmit the authorization request message to an authorization computer 120 to initiate a payment transaction. The authorization computer 120 may generate an authorization response message in response.

In some embodiments, the authorization module 334, in conjunction with the processor 320, can initiate a plurality of actions by generating and submitting authorization request messages to a plurality of authorization computers. For example, the authorization request module 334 can interact with the database 340 to determine a primary account identifier (PAN) or payment token of the user associated with the authentication message. The authorization request module 334 and the processor 320 of the service computer 150 may then generate the authorization request message and transmit the authorization request message to the authorization computer 120.

In some embodiments, the authorization module 334 can, in conjunction with the processor 320, initiate actions by generating and submitting transaction initiation messages to a plurality of resource provider computers. For example, the authorization module 334, in conjunction with the processor 320, can interact with the database 340 to determine a primary account identifier (PAN) or payment token of the user associated with the authentication message. The authorization request module 334 and the processor 320 of the service computer 150 may then generate a transaction message or messages that can be sent to the resource provider computers 110A, 110B, 110C. A resource provider computer can use the information from the transaction message to generate an authorization request message that can be sent to the authorization computer 120.

The resource provider module 336 may, in conjunction with the processor 320, be configured to identify resource provider information from the authentication message received from the client computer 130. For example, the one or more resource provider computers 110A, 110B, 110C may register with the service computer 150 before the service computer 150 receives the authentication message from the client computer 130. During this registration process, the one or more resource provider computers 110 can provide an identifier that uniquely identifies the resource provider to an authorization computer 120 (e.g., merchant code, etc.), routing details, payment delivery address, or other transaction information in order to complete a transaction with the one or more resource provider computers 110. This information may be stored in the database 340. When the authentication message is received from the client computer 130, the resource provider module 336 and the processor 320 may identify a resource provider from the authentication message, determine additional information about the resource provider in the database 340, and generate the authentication request message by using information from the authentication message received from the client computer 130 and information stored in the database 340.

In some embodiments, the resource provider module 336 may, in conjunction with the processor 320, be configured to transmit the registered resource provider computer information to the client computer 130. In some embodiments, the client computer 130 may store information only associated with the resource provider computers that provide messages to the client computer 130. In this example, the client computer 130 may generate an authentication message that initiates an action for resource provider computer 110A, rather than the service computer 150 (e.g., user confirms "ok to proceed" regarding the received deadline, and the resource provider computer 110A generates an authorization request message in response to receiving the authentication message from the client computer 130, etc.).

Returning to FIG. 1, the service computer 150 may generate and transmit a message to the authorization computer 120 to perform an additional action. The authorization computer 120 may be operated by an entity such as an issuer.

In some examples, the authorization computer 120 may determine whether a transaction is approved or declined, based at least in part on data included with the authorization request message that the authorization computer 120 received from the service computer 150. The authorization computer 120 may maintain an account for the user that operates the client computer 130. The authorization computer 120 may generate a transaction response message that comprises the approval/decline of the transaction and may transmit it to a resource provider computer.

Figure 4:
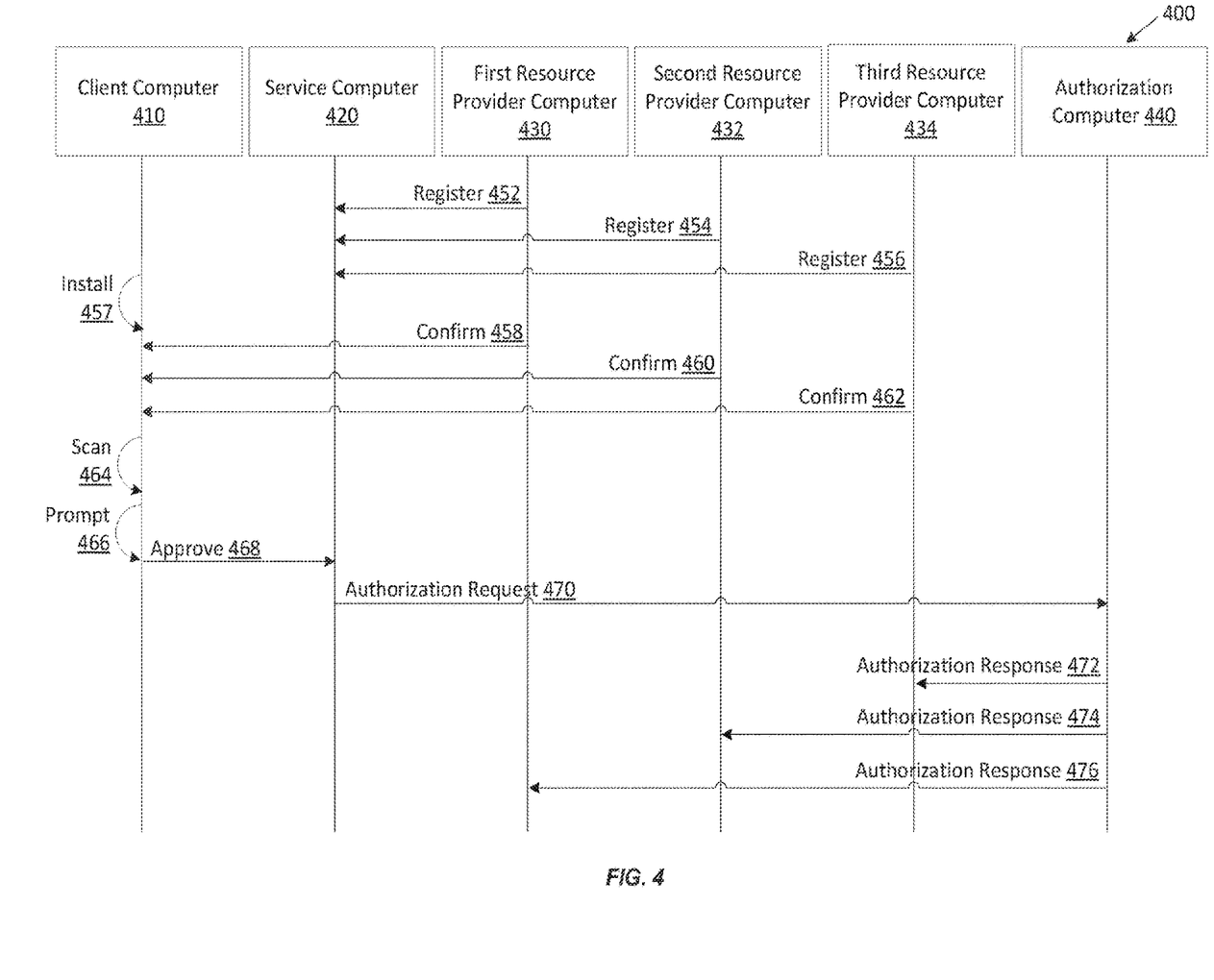
FIG. 4 shows a flow diagram illustrating an embodiment of the invention.

FIG. 4 shows a flowchart illustrating an embodiment of the invention. The process 400 may comprise a client computer 410, a service computer 420, a first resource provider computer 430, a second resource provider computer 432, third resource provider computer 434, and an authorization computer 440.

At 452, the first resource provider computer 430 may register with the service computer 420. During the registration, the first resource provider computer 430 may provide an identifier associated with the first resource provider computer 430, an identifier associated with the user operating the client computer 410 (e.g., that interacts with the first resource provider computer 430, etc.), and other registration information to the service computer 420. In some examples, the registration information may comprise an identifier that is associated with an account that that can provide funds in response to a transaction request, and an identifier that is associated with an account that receives those funds in response to a transaction request. The service computer 420 may store this and other information for later use.

At 454, the second resource provider computer 432 may register with the service computer 420. At 456, the third resource provider computer 434 may register with the service computer 420. These steps may be similar to step 452.

At 457, the client computer 410 may download and/or install a software application to the client computer 410. The software application may cause the client computer 410 to automatically and periodically scan messages that have been received by the client computer 410. Such messages include messages from the first resource provider computer 430, second resource provider computer 432, and third resource provider computer 434. In some examples, the text and email messages may be stored locally with the client computer 410 and the application may scan these messages.

Another sample process for accessing these messages to scan can be described with respect to FIG. 5. The client computer 530 may access a database 540 where one or more resource provider uniform resource locators (URLs) are stored. Each resource provider URL may correspond with a user name and password that the user may use to access the user's account stored with the resource provider. The client computer 530 can access the URL associated with the resource provider through a browser application 520, provide the user name and password stored in the database 540, and access deadline and other information associated with the resource provider (e.g., bill data, task description associated with the deadline, etc.).

In some examples, the client computer 410 may proceed through a registration process with the resource provider computers. For example, an initial scan may be conducted at the client computer 410 to identify any existing messages at the client computer 410 or resource provider computers that have transmitted notification messages to the client computer 410. If any are found, the client computer 410 may display a prompt for the user, asking the user if they would like to add the particular resource provider to an auto-notification service (e.g., auto-payment, auto-read response, auto-delegation response, etc.). The client computer 410 may identify which resource providers the user would like to establish an auto-response (e.g., identified through a scanning process in the text or email messages at client computer 410, etc.). In some examples, the client computer 410 may skip the registration process, or the application may present all notification messages that are discovered during the scanning process without first questioning the user.

In some examples, the client computer 410 may provide an interface to list all resource providers which the user has subscribed to. Other restrictions may be considered as well. For example, the resource provider can provide electronic notification messages of upcoming deadlines or the resource provider can offer electronic bills, etc. The user may select one or more resource providers to enable automated responses by the client computer 410. As a sample illustration, the client computer 410 may provide a color-coded interface, such that green tiles may be resource providers which user has opted for auto-payments and red tiles may correspond with auto-payments that are available. However, the user may have decided not to initiate auto-payments. Once the user selects the appropriate tiles and saves the selection (e.g., by selecting the "save preferences" tool button), the client computer 410 can determine a list of resource providers that the user would like to enable auto-payment (e.g., the tiles with green background). The list may be saved in a database. During the next billing cycle or future messages, these services may be automatically selected for payment.

Referring to FIG. 4, at 458, the first resource provider computer 430 may transmit a first notification message of an upcoming deadline to the client computer 410. At 460, the second resource provider computer 432 may transmit a second notification message of an upcoming deadline to the client computer 410. At 462, the third resource provider computer 434 may transmit a third notification message of an upcoming deadline to the client computer 410. These messages may be stored with in a text message interface or email inbox operated by the user.

At 464, the client computer 410 may initiate a scan. For example, the client computer 410 can automatically and periodically scan a user's email and text messages for any notifications that include an upcoming deadline. This notification message, for example, may include a recurring bill, notification message of an upcoming deadline for a task, or an event notification message associated with future actions and due dates. The client computer 410 can compare the text of email and/or text messages (e.g., including short message service (SMS) messages, etc.) to a template of known resource providers' bills. The templates may be stored with the client computer 410 and/or corresponding database (e.g., remote from the client computer 410, hosted by a backend computer or network, etc.).

Figure 6:
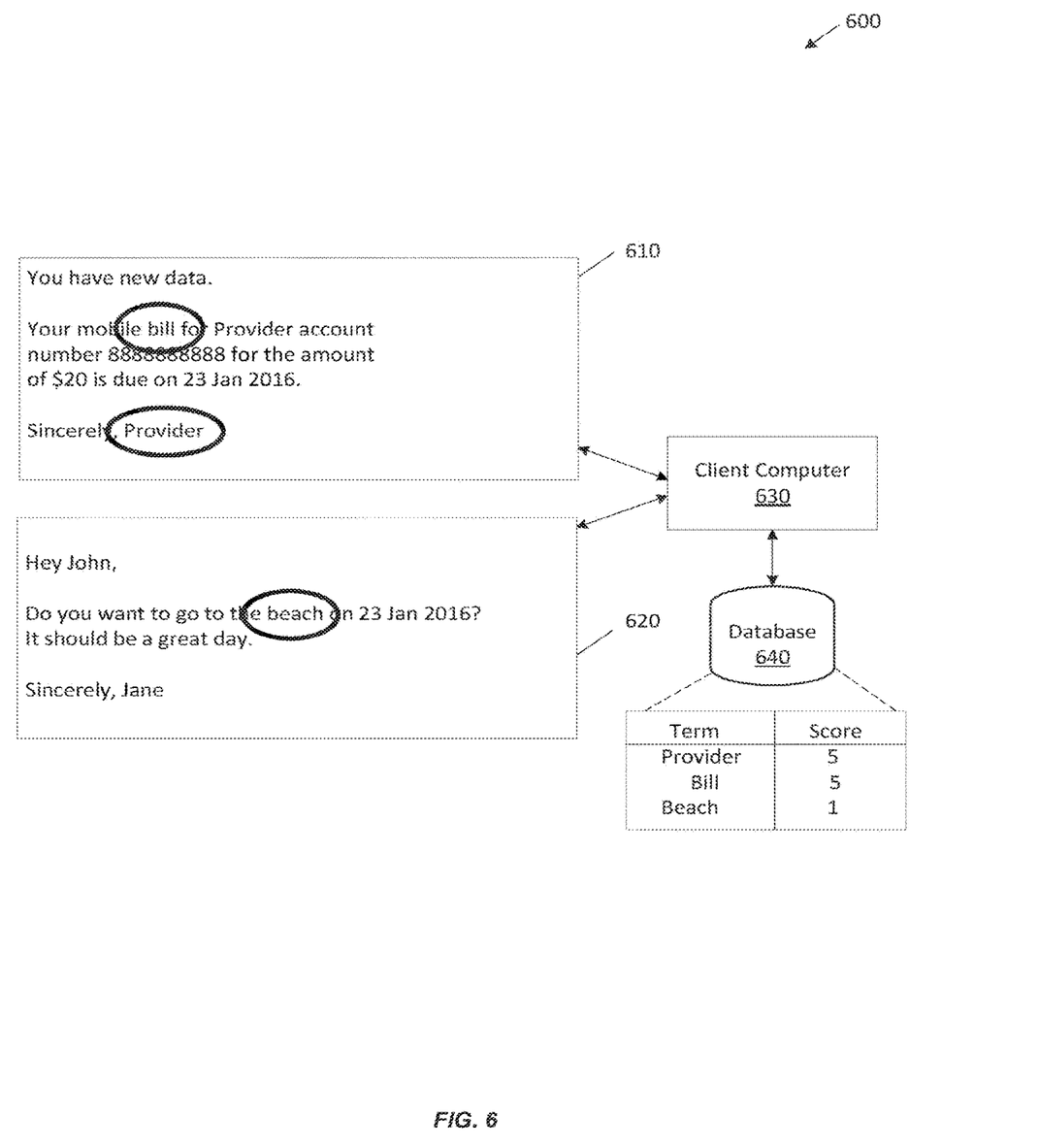
FIG. 6 shows a process for parsing messages, according to one embodiment of the invention.

One sample scanning process can be described with reference to FIG. 6. In process 600, the scan by the client computer 630 may include identifying one or more terms in the messages 610, 620 and/or comparing messages 610, 620 with templates to determine a similarity score. For example, the messages 610, 620 can be compared with templates using a pattern matching algorithm in order to classify the messages to determine if they are associated with pre-existing recurring notification messages. In some embodiments, the pattern matching algorithm can compare new messages to the patterns of existing templates stored in the database 640. The pattern matching algorithm can identify specific keywords in the message (e.g., "bill," "provider," "beach," etc.) and compute a similarity score. If the score is above a pre-determined threshold (e.g., 50%, etc.), the application may determine that the message corresponds with an electronic bill from the resource provider and/or a bill reminder.

If the message does not meet or exceed the minimum similarity score requirement, the client computer 630 may initiate an entity recognition algorithm. The entity recognition algorithm can scan the message to determine data (e.g., using text received in the message, an optical character recognition (OCR), or a text comparison algorithm using one or more keywords stored with the database, etc.). The data may comprise a resource provider name (e.g., the service provider), unique bill identifier (ID), amount due, due date, or other information. The entity recognition algorithm may use rule-based techniques, statistical models, and/or entity recognition algorithms based on Hidden Markov Model (HMM) or Conditional Random Fields (CRF). For example, the entity recognition algorithm may use statistical/probabilistic modeling to train the machine using tagged/annotated data. The process may obtain a list of commonly occurring data in a typical reminder message. These data can include instances of:

1. time (9 AM, 9:00, etc.)
2. date (12/11/2016, 6 Jan, etc.)
3. resource provider name (e.g. Acme Co., etc.)
4. payment mode supported (Credit card, VISA, etc.)
5. amount ($34, etc.)

Figure 7:
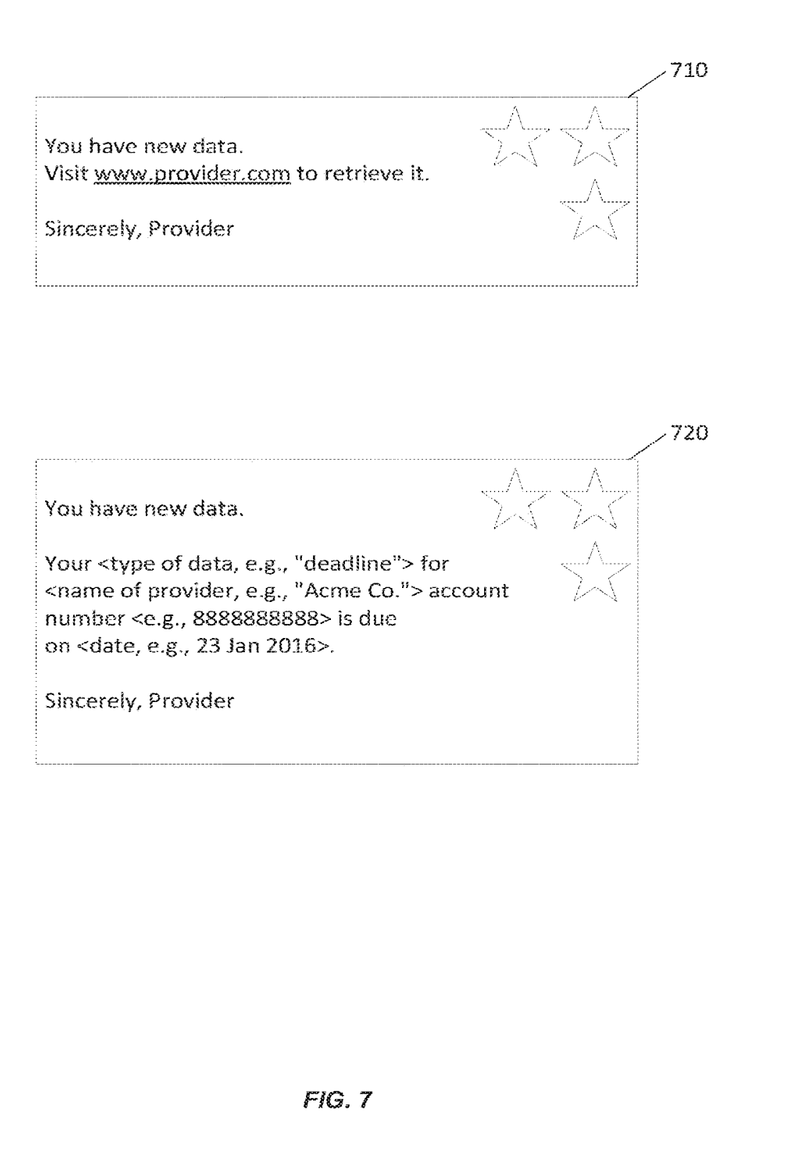
FIG. 7 illustrates two examples messages received at a client computer, according to one embodiment of the invention.

Two examples of notification messages are provided with FIG. 7. At 710, the notification message may instruct the client computer 410 to access deadline information at a remote location. The client computer 410 can identify the resource provider in the notification message and assume that the notification message is associated with a deadline. Another example of a notification message is illustrated with 720. For example, the notification message 720 can comprise terms that correspond with a template associated with a resource provider computer and/or the client computer may train a decision tree classifier with a sample set of tagged sentences to identify terms in the notification message 720. An illustrative example of the format of the notification message 720 could include:

Your <type of data, e.g., "deadline"> for <name of provider, e.g., "Acme Co."> account number <e.g., 8888888888> is due on <date, e.g., 23 Jan. 2016>.

In some examples, the decision tree algorithm can be trained using a training data set during the installation process described at step 457. Once the training is complete and decision model is in place, the model may help classify the incoming text or email messages. This decision model can determine new data in incoming messages. In some examples, the incoming messages may be identified if the message includes at least a payment amount, resource provider, and due date. If all the required data are found, the message and the extracted data can be classified as a particular type of message with a deadline for further actions (e.g., an electronic bill that needs payment, or an email request that requires an email response, etc.).

In some examples, the incoming messages can originate from recognized resource providers that may be associated with one or more templates stored in the database. If the message originated from one of these resource providers, the client computer 410 may recognize particular data fields and extract data by comparing the text of the message with a pre-defined template. The data may include a resource provider name, user or account identifier, amount due, payment deadline, payment address, unique identifier associated with the bill, and the like. Data may be stored with a database of the client computer 410 and linked to the user and/or resource provider(s).

At 466, the client computer 410 may provide a prompt. For example, when one or more notification messages with deadlines are identified, the client computer 410 may aggregate data from the one or more notification messages that fall within a time range. The aggregated data may be displayed in an interface for review by the user. A sample interface is illustrated with FIG. 8. For example, the user interface 810 may display five resource providers that correspond with tasks A, B, C, D, and E and deadlines in the month of January. The user interface 810 may also provide a tool 820 to respond to each of these deadlines with just one interaction.

At 468, the client computer 410 may approve of additional actions in response to the notification message of the deadlines. The additional actions may include generating an authentication message that confirms that the user approved of the further action by the service computer 420. In some examples, the activation of the tool 820 may initiate a generation of an authentication message. For example, once authenticated, the application may generate the authentication message with the user's information. As a sample illustration, the authentication message may comprise authentication data and/or proof of authentication, the payment information received during the authentication process, including a user's name, payment account identifier, and approval to deduct funds from the user's account and transfer those funds to the resource provider's account, using a payment gateway and/or transaction processing network (TPN).

At 470, the service computer 420 may initiate authorization requests for deadlines associated with bill payment transactions. The transactions can be conducted various ways. In some examples, the service computer 420 may provide a single, consolidated transaction for the user and split the single payment into separate transactions for each of the resource providers (e.g., as a split payment transaction, etc.). In some examples, the user may view, on the client computer, multiple payment transactions at the user's account that correspond to the multiple, individual transactions with each of the resource providers. The service computer 420 may initiate the payment transactions. With any type of transaction, the user may only provide a single authentication and activation of the tool to initiate the processing of multiple transactions.

At 472, the authorization computer 440 may receive one or more authorization requests and determine whether a transaction is approved or declined, based at least in part on data included in the one or more authorization request messages. The authorization computer 440 may also generate one or more authorization response messages to transmit to the resource provider computers 430, 432, 434. Accordingly, at 472, the authorization computer 440 may transmit a first authorization response message to the third resource provider computer 434. At 474, the authorization computer 440 may transmit a second authorization response message to the second resource provider computer 432. At 476, the authorization computer 440 may transmit a third authorization response message to the first resource provider computer 430.

At the end of the day or at any other suitable period of time, a clearing and settlement process can occur between the resource provider computers (or their acquirers) and the authorization computer. A payment processing network may facilitate the settlement process.

Figure 9:
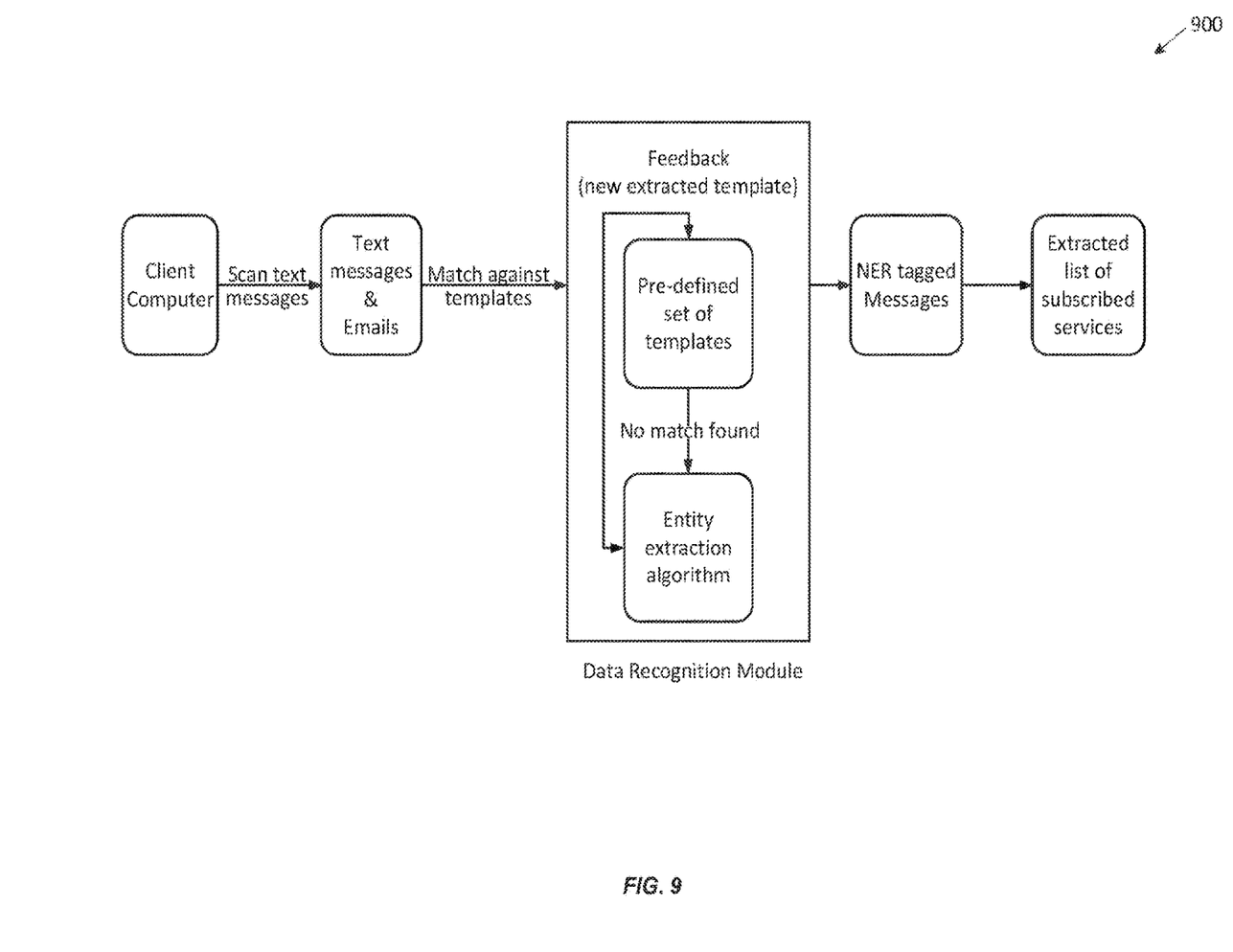
FIG. 9 shows a process for automated data discovery with aggregated authentication and authorization, according to one embodiment of the invention.

FIG. 9 shows a process for automated data discovery with aggregated authentication and authorization, according to one embodiment of the invention. For example, in a payment transaction embodiment, the process 900 is initiated, at least in part because users may receive many bills from many resource providers throughout the year. These bills are received by users at various times throughout the year, and each of these bills correspond with various due dates that are set by the individual resource providers. Users are forced to pay these bills in response to the resource provider's timelines without a way to manage these deadlines.

The data from one or more bills may be summarized and displayed by the application at an interface. The summary may be generated by the application as a process that occurs at a pre-determined time of each month (e.g., the 15th of each month, etc.). The data for the summary may be retrieved from the database, and such data may be limited to a particular date range (e.g., 16th of the prior month to 15th of the current month, etc.). The summary of bills may include a listing of payment and/or bill data that corresponds with each particular resource provider. The interface may also include the payment deadline for a particular bill that corresponds with each resource provider. The application may display the bill summary and support user interaction at the client computer (e.g., by allowing the user to select a particular bill for more information, or retrieve additional detail associated with the bill, etc.).

The interface may provide an interactive tool to authenticate the user and/or pay all bills provided by the interface at one time. For example, the tool (e.g., an image of a button, etc.) may be displayed by the interface at the client computer and activated by the user as a single activation (e.g., a single tap or click on the button on the interface of the client computer, etc.). Once activated, the application may authenticate the user by asking the user provide user name, password, and/or payment information (e.g., credit account number, debit account number, etc.). In some examples, the authentication may be received through a third party application (e.g., Apple® Pay, Android® Pay, etc.) where the user provides a password or other authentication to the third party payment application and the third party payment application proceeds to authenticate the user.

Embodiments of the invention can streamline the bill payment process for users. For example, the user may separately subscribe to one or more recurring services (e.g., utility bills including telephone bill, internet bill, gas bill, etc.) and/or subscribe to bills that are transmitted to the client computer in an electronic format from the resource provider (e.g., which will accept electronic payments, etc.). The client computer may, in turn, receive these bills via email or text messages at their client computer. In some examples, the user may provide login credentials and other access for the application in order for the application to access these bills.

As a sample illustration, the user may select the tool displayed at a user interface by the client computer to provide authentication for all of the displayed bills. The selection of the tool may be performed once. The client computer receives the single authentication from the user and accesses the first bill on the interface. The client computer generates a first authorization request message with the first resource provider identifier, first payment amount, and user's first account identifier. The client computer may send the first authorization request message at substantially the same time as the user provides their authentication, or wait to send the first authorization request message until a later date closer to the deadline identified by the resource provider's corresponding bill. The client computer may then generate a second authorization request message with the second resource provider identifier, second payment amount, and user's second account identifier. The same user that provided the authentication may correspond with the first account identifier and the second account identifier.

These authorization request messages may be sent for each bill displayed by the interface and associated with the single authentication from the user. The authorization request messages may be sent by the client computer to a service computer, authorization computer, and/or other payment gateway for authorization. The computer may authorize the transaction or transmit the authorization request messages to an authorization computer to authorize. After authorization, the funds may be transferred from the user account to the resource provider account during settlement. The client computer can generate a consolidated receipt as well, which summarizes each of the payment amounts and resource providers conducted by the client computer.

This process may help relieve users of manual bill payments by providing recurring payment with a single step. The application can correlate the single authentication from the user with individual bill payments and a transaction processing network (TPN). Once authenticated, the payment service can receive a single touch authentication, generate an authentication token that includes the user's payment information, and send the token for payment. The TPN can register the token. Once the payment is successfully settled, the user will be notified with a consolidated receipt along with the break-up of all the bills paid.

As another sample illustration, the user may download a software application to a client computer (e.g., mobile phone, etc.) and provide the software application with a username and password to access their email account. The application can login to the email account periodically (e.g., according to a predetermined schedule, in response to receiving a notification message that a new email has been received, etc.) and automatically (e.g., without instruction from the user, etc.). With each login, the application can scan the user's e-mail messages and compare the recognized terms in the messages with a dictionary of terms (e.g., "deadline" etc.). If any terms in the message match the terms in the dictionary, the application can identify dates associated with that recognized term and store the data in a memory at the client computer. This may include, for example, "the deadline for response is January 1$^{st}$" where "response" and "January 1$^{st}$" are stored in the memory. At a later time, the stored information from the memory may be aggregated and displayed on a user interface at the client computer. The user can review the deadlines and respond to all the deadlines with one interaction at the user interface. The response, for example, may be to delegate further actions to another user (e.g., the application may generate and send a consolidated summary of deadlines to a second client computer, etc.), confirm receipt of the deadlines (e.g., the application may generate multiple acknowledgement receipt messages and send each receipt message to the sender of the original message, etc.), and the like.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Some embodiments of the present invention can be implemented in the form of control logic in software or hardware or a combination of both. The control logic may be stored in an information storage medium as a plurality of instructions adapted to direct an information processing device to perform a set of steps disclosed in an embodiment of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method comprising:
   receiving, by a client computer, a plurality of messages associated with a plurality of resource providers including a plurality of dates;
   automatically and periodically scanning, by the client computer, the plurality of messages associated with the plurality of resource providers at predetermined times;
   identifying a set of messages from the plurality of messages, for which actions may be performed, that are within a predetermined time range;
   aggregating deadlines for the identified set of messages that are associated with the plurality of resource providers;
   prompting, by the client computer, a user of the client computer to determine if actions are to be performed with respect to services associated with the identified set of messages in the plurality of messages;
   receiving, by the client computer, an authentication credential from the user in response to the prompting; and
   transmitting, by the client computer, an authentication message to a server computer, wherein the server computer initiates the actions with respect to services associated with the set of messages, wherein the server computer initiates actions with respect to the services by generating and submitting authorization request messages to one or more authorization computers, or wherein the server computer initiates actions with respect to the services by generating and submitting transaction initiation messages to a plurality of resource provider computers associated with the plurality of resource providers.

2. The method of claim 1, wherein the plurality of messages are present in a text message interface or an e-mail box operated by the user.

3. The method of claim 1, wherein the client computer is a mobile phone.

4. The method of claim 1, wherein the one or more authorization computers comprise a plurality of authorization computers.

5. The method of claim 1, wherein the server computer initiates actions with respect to the services by generating and submitting transaction initiation messages to the plurality of resource provider computers.

6. The method of claim 5, wherein the resource provider computers are registered with the server computer.

7. The method of claim 1, further comprising:
   analyzing the set of messages having dates within the predetermined time range; and
   generating a consolidated summary comprising a deadline from the set of messages having dates within the predetermined time range.

8. The method of claim 1, wherein the set of messages comprise event descriptions and the deadlines.

9. The method of claim 1, further comprising:
   providing an option, by the client computer, to delegate additional actions with respect to the services associated with the set of messages to a second client computer.

10. A client computer comprising:
    a memory configured to store computer-executable instructions; and
    a processor in communication with the memory configured to execute the computer-executable instructions to at least:
    receive a plurality of messages associated with a plurality of resource providers including a plurality of dates;
    automatically and periodically scan, by the client computer, the plurality of messages associated with the plurality of resource providers at predetermined times;
    identifying a set of messages from the plurality of messages, for which actions may be performed, that are within a predetermined time range;
    aggregating deadlines for the identified set of messages that are associated with the plurality of resource providers;

prompt a user of the client computer to determine if actions are to be performed with respect to services associated with the identified set of messages in the plurality of messages;

receive an authentication credential from the user in response to the prompting; and transmit an authentication message to a server computer, wherein the server computer initiates the actions with respect to services associated with the set of messages, wherein the server computer initiates actions with respect to the services by generating and submitting authorization request messages to one or more authorization computers, or by generating and submitting transaction initiation messages to a plurality of resource provider computers associated with the plurality of resource providers.

11. The client computer of claim 10, wherein the plurality of messages are present in a text message interface or an e-mail box operated by the user at some time point.

12. The client computer of claim 10, wherein the client computer is a mobile phone.

13. The client computer of claim 10, wherein the one or more authorization computers comprises a plurality of authorization computers.

14. The client computer of claim 10, wherein the server computer initiates actions with respect to the services by generating and submitting transaction initiation messages to the plurality of resource provider computers.

15. The client computer of claim 14, wherein the resource provider computers are registered with the server computer.

16. The client computer of claim 10, further comprising:
analyzing the set of messages having dates within the predetermined time range; and
generating a consolidated summary comprising a deadline from the set of messages having dates within the predetermined time range.

17. The client computer of claim 10, further comprising:
providing an option, by the client computer, to delegate additional actions with respect to the services associated with the set of messages to a second client computer.

18. A method comprising:
receiving, by a server computer, an authentication message from a client computer, the authentication message either including an authentication credential or an authentication result of the authentication credential by the client computer; and
initiating, by the server computer, actions with respect to services associated with a set of messages associated with a plurality of resource providers, the set of messages having dates within a predetermined range, the set of messages being within a plurality of messages that was previously transmitted by a plurality of resource provider computers to the client computer, wherein deadlines for the set messages is aggregated in order to determine that the actions are to be performed with respect to the services associated with the set of messages,
wherein the server computer initiates actions with respect to the services by generating and submitting authorization request messages to one or more authorization computers, or by generating and submitting transaction initiation messages to the plurality of resource provider computers associated with the plurality of resource providers.

19. The method of claim 18, wherein the one or more authorization computers comprise a plurality of authorization computers.

20. The method of claim 18, wherein the server computer further initiates actions with respect to the services by generating and submitting transaction initiation messages to the plurality of resource provider computers.

* * * * *